United States Patent [19]

Sasaki

[11] Patent Number: 5,414,464
[45] Date of Patent: May 9, 1995

[54] IMAGE SENSOR AND ELECTRONIC STILL CAMERA WITH AN ADDRESSABLE IMAGE PICKUP SECTION AND AN ANALOG PRODUCT SUM CALCULATION SECTION

[75] Inventor: Tadao Sasaki, Kanagawa, Japan

[73] Assignee: Sony Corporation, Tokyo, Japan

[21] Appl. No.: 223,235

[22] Filed: Apr. 5, 1994

[30] Foreign Application Priority Data

Apr. 9, 1993 [JP] Japan ................................ 5-083316

[51] Int. Cl.⁶ ............................................. H04N 5/228
[52] U.S. Cl. ................................... 348/222; 348/231; 358/909.1
[58] Field of Search .............................. 348/222, 231; 358/909.1, 906, 209; H04N 5/228, 5/76, 5/30

[56] References Cited

U.S. PATENT DOCUMENTS

| | | | |
|---|---|---|---|
| 4,475,131 | 10/1984 | Nishizawa | 348/231 |
| 5,016,107 | 5/1991 | Sasson | 358/906 |
| 5,083,150 | 1/1992 | Nagasaki | 348/356 |
| 5,249,053 | 9/1993 | Jain | 358/906 |

*Primary Examiner*—James J. Groody
*Assistant Examiner*—Sherrie Hsia
*Attorney, Agent, or Firm*—Jay H. Maioli

[57] ABSTRACT

An electronic still camera wherein an image compression circuit can be simplified includes a lens system, a shutter, an image sensor and a processing circuit. A video signal for one frame outputted from the processing circuit in response to a shutter operation is written into a memory. A video signal read out from the memory is compressed in accordance with the JPEG system by an image compression circuit and then written into a memory card. The image sensor is constituted from an image pickup section and a product sum calculation section. A CMD image sensor capable of non-destructively reading out a picture signal is used as the image pickup section. The product sum calculation section performs DCT processing required for compression processing of the JPEG system. Since a detected image signal processed by DCT processing is obtained from the image sensor, DCT processing of the image compression circuit is unnecessary.

10 Claims, 6 Drawing Sheets

20 : CMD ELEMENT

IMAGE SENSOR AND ELECTRONIC STILL CAMERA WITH AN ADDRESSABLE IMAGE PICKUP SECTION AND AN ANALOG PRODUCT SUM CALCULATION SECTION

BACKGROUND OF THE INVENTION

1. Field of the Invention

This invention relates to an image sensor and an electronic still camera which records an image signal outputted from the image sensor onto a recording medium such as a memory card.

2. Description of the Related Art

Electronic still cameras have such a general construction as shown in FIG. 7. Referring to FIG. 7, the electronic still camera shown includes a lens system 1, a shutter mechanism 2, and an image sensor 3 such as a CCD (charge-coupled device). A detected image signal outputted from the image sensor 3 is supplied to a processing circuit or camera signal processing circuit 4. The detected image signal is processed by and outputted from the processing circuit 4 in the form of primary color signals R, G and B of red, green and blue, respectively, or in the form of a brightness signal Y and a pair of color difference signals U and V.

The shutter mechanism 2 is opened or closed by a shutter drive circuit 6 under the control of a control circuit 5. An image is detected by the image sensor 3 in response to a shutter releasing operation, and thereupon a video signal is outputted from the processing circuit 4 and converted into a digital signal by an analog to digital (A/D) converter 7, whereafter it is supplied to a frame memory 8 which constitutes an image memory so that the video signal for one frame is written into the frame memory 8.

Then, the video signal for one frame read out from the frame memory 8 is compressed by an image compression circuit 9 and then written into a memory card 10 serving as a recording medium.

Though not described above, operation of the processing circuit 4, the frame memory 8, the image compression circuit 9, the memory card 10 and some other elements is controlled by the control circuit 5 while read pulses, transfer pulses and some other pulses required by the image sensor 3 and sampling pulses and some other necessary timings required by the analog to digital converter 7 are supplied from a timing generator 11.

An electronic still camera of the construction described above is disclosed in U.S. patent application Ser. No. 08/114,168 filed Sep. 1, 1993 and assigned to the same assignee.

In the image compression circuit 9, high efficiency compression based on, for example, the JPEG system is performed. Compression processing of the JPEG system involves orthogonal transformation processing such as DCT (discrete cosine transform). While such orthogonal transformation processing is normally performed by a digital circuit, such digital circuit is disadvantageous in that it is complicated because it involves a product sum calculator or a like element.

SUMMARY OF THE INVENTION

It is an object of the present invention to provide an image sensor and an electronic still camera which can assure a simplified construction of a circuit for use therewith.

In order to attain the object described above, according to an aspect of the present invention, there is provided an image sensor, which comprises an image pickup section capable of non-destructively reading out a picture element signal, and a product sum calculation section for selectively and successively reading out a plurality of picture element signals from the image pickup section, multiplying the picture element signals by predetermined coefficients and adding the signals obtained by the multiplication to obtain an output picture element signal.

With the image sensor, since product sum calculation processing such as orthogonal transformation processing or spatial filter processing can be performed by the product sum calculation section, where the image sensor is incorporated, for example, in an electronic still camera wherein an image signal outputted from the image sensor is compressed and recorded onto a recording medium, orthogonal transformation processing or like processing of a compression processing circuit of the electronic still camera can be eliminated, and consequently, the compression processing circuit can be simplified in construction.

According to another aspect of the present invention, there is provided an electronic still camera, which comprises an image pickup section capable of non-destructively reading out a picture element signal, a product sum calculation section for selectively and successively reading out a plurality of picture element signals from the image pickup section, multiplying the picture element signals by predetermined coefficients and adding the signals obtained by the multiplication to obtain an output picture element signal, compression means for compressing the output picture element signal, and means for recording the compressed signal onto a recording medium.

With the electronic still camera, since orthogonal transformation processing or like processing can be performed by the product sum calculation section, which may constitute an image sensor together with the image pickup section, orthogonal transformation processing or like processing of the compression means can be eliminated, and consequently, the compression means can be simplified in construction.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENT

First, description will be given of spatial filter processing and orthogonal transformation processing. Spatial filter processing can be performed by a product sum calculation wherein two-dimensional picture element signals are multiplied by suitable coefficients and then the products are added to obtain a sum. For example, a 3×3 filter is represented by equation (1) given below:

$$F = \begin{matrix} K_{00} & K_{01} & K_{02} \\ K_{10} & K_{11} & K_{12} \\ K_{20} & K_{21} & K_{22} \end{matrix} \quad \begin{matrix} D_{00} & D_{01} & D_{02} \\ D_{10} & D_{11} & D_{12} \\ D_{20} & D_{21} & D_{22} \end{matrix}$$

where $K_{00}$ to $K_{22}$ are coefficients, and $D_{00}$ to $D_{22}$ are picture element signals.

Figure 6:
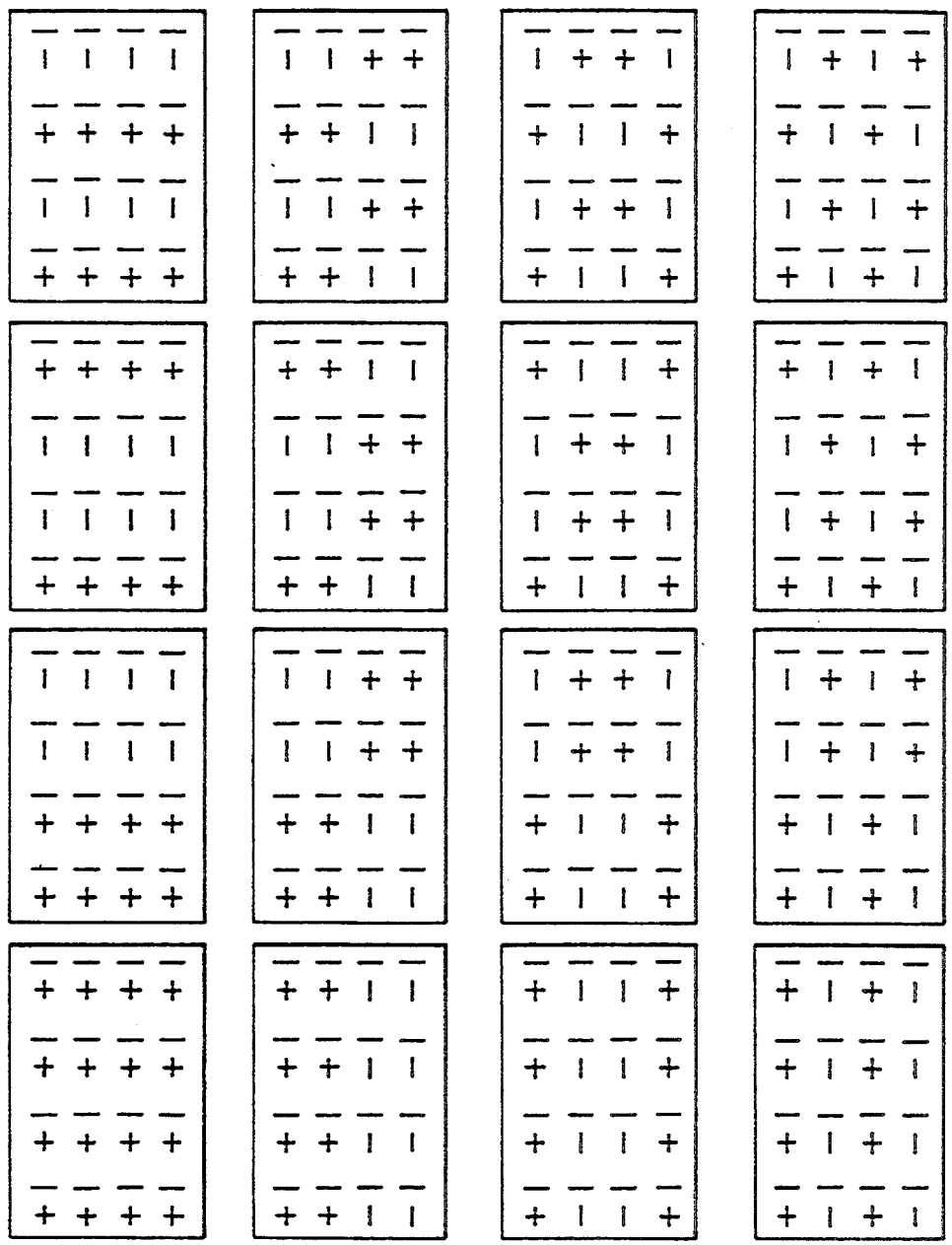
FIG. 6 is a diagrammatic view showing coefficients which may be used in orthogonal transformation processing.

Meanwhile, orthogonal transformation processing is considered to be a kind of spatial filter processing described above and can be performed by similar calculation to that of the spatial filter processing described above. However, in the orthogonal transformation, calculation is performed by a plurality of times for a same set of picture element signals varying coefficients. An example of a set of coefficients where only $-1$ and $+1$ are used as coefficients, for example, in the case of a set of 4×4 picture element signals, is shown in FIG. 6.

Figure 1:
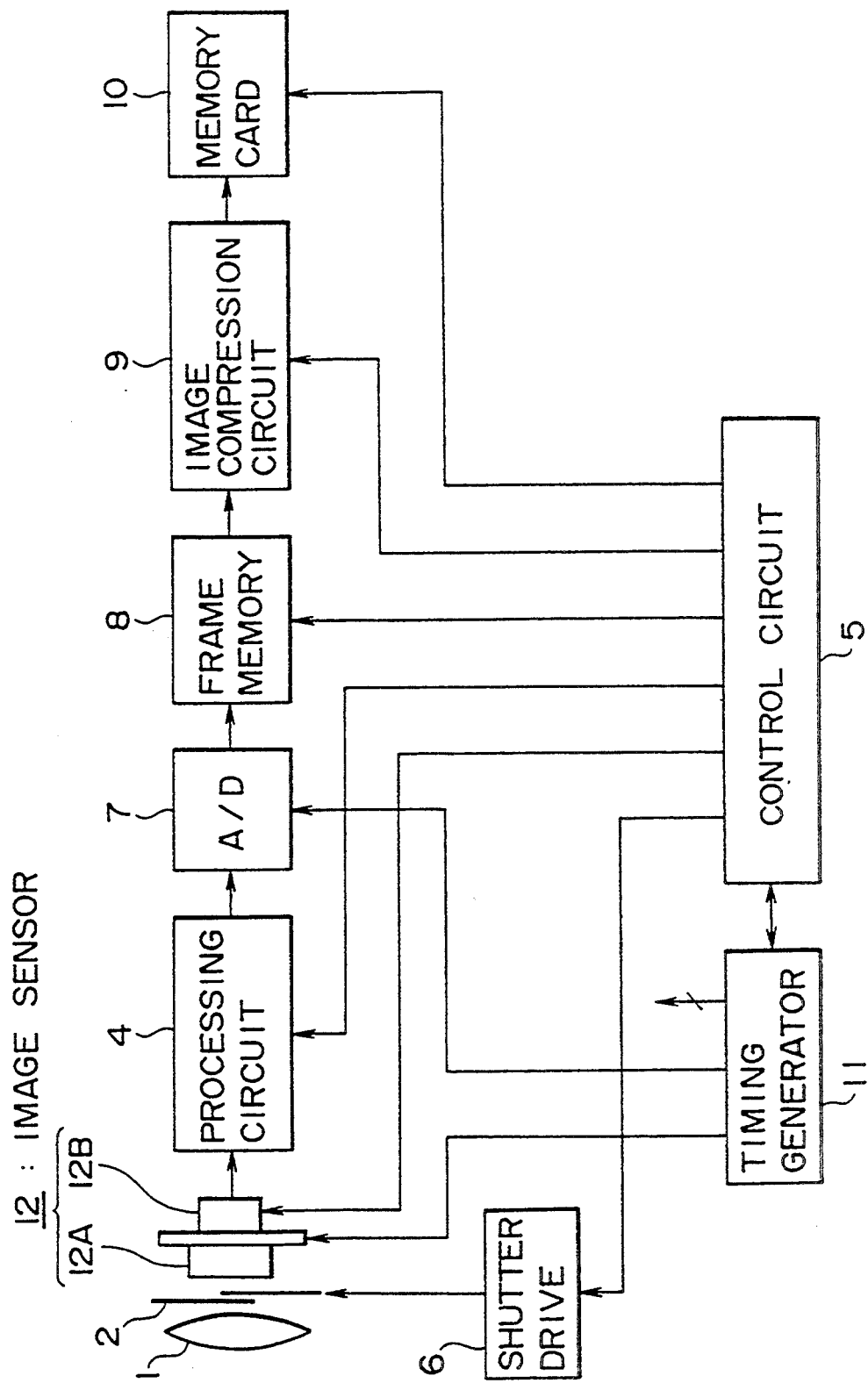
FIG. 1 is a block diagram of an electronic still camera to which the present invention is applied.
Figure 7:
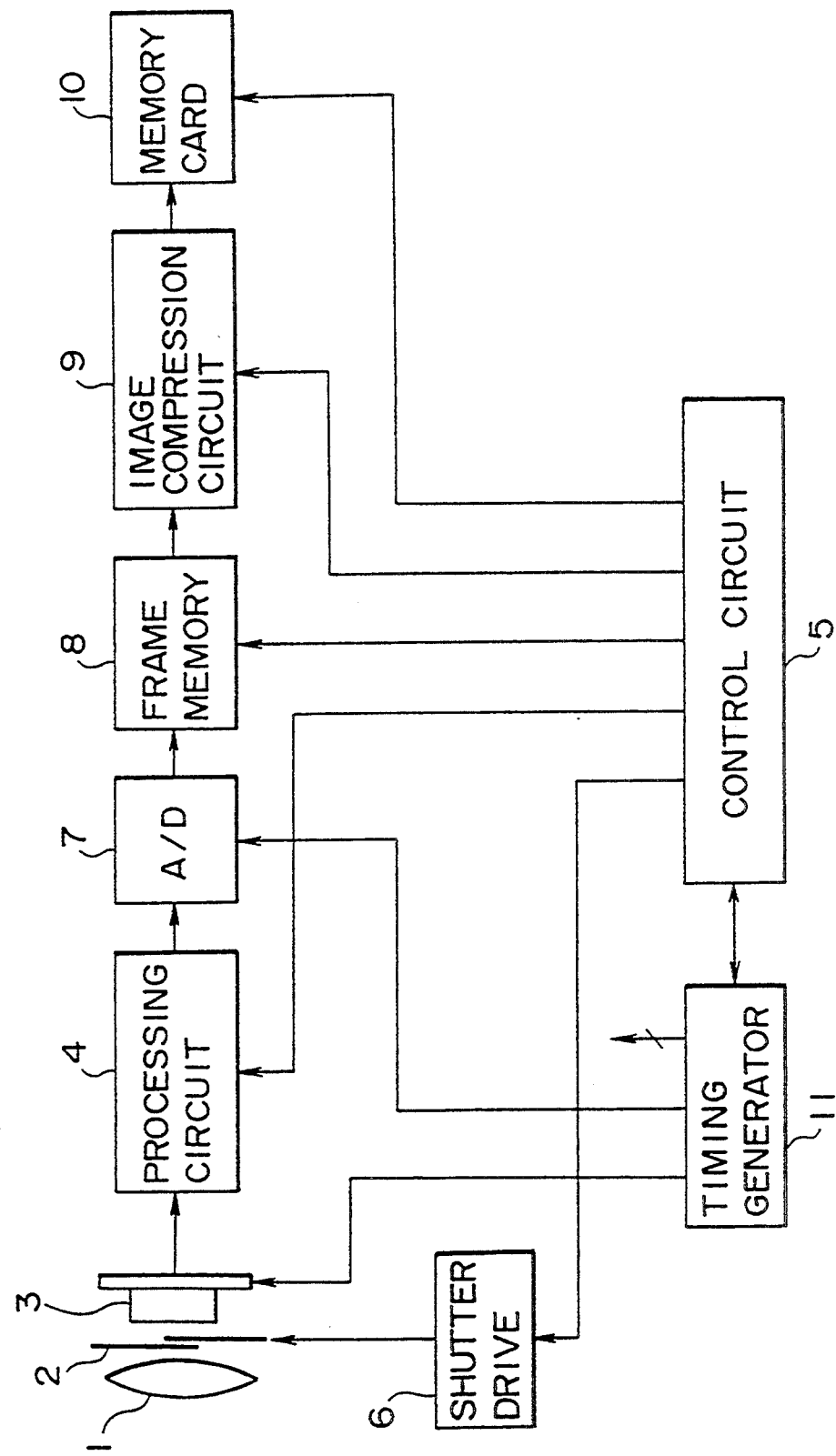
FIG. 7 is a block diagram of a conventional electronic still camera.

Referring now to FIG. 1, there is shown an electronic still camera to which the present invention is applied. The electronic still camera shown has a somewhat common construction to that of the electronic still camera described hereinabove with reference to FIG. 7. In particular, the electronic still camera includes, similarly to the electronic still camera of FIG. 7, a lens system 1, a shutter mechanism 2, a camera signal processing circuit 4, a control circuit 5, a shutter drive circuit 6, an analog to digital (A/D) converter 7, a frame memory 8, an image compression circuit 9, a memory card 10 and a timing generator 11. The electronic still camera further includes an image sensor 12 in place of the image sensor 3 of the electronic still camera of FIG. 7.

The image sensor 12 includes an image pickup section 12A and a product sum calculation section 12B. The image pickup section 12A can read out its picture element signals by non-destructive reading. For example, a CMD (charge modulation device) image sensor is employed for the image pickup section 12A.

Figure 2:
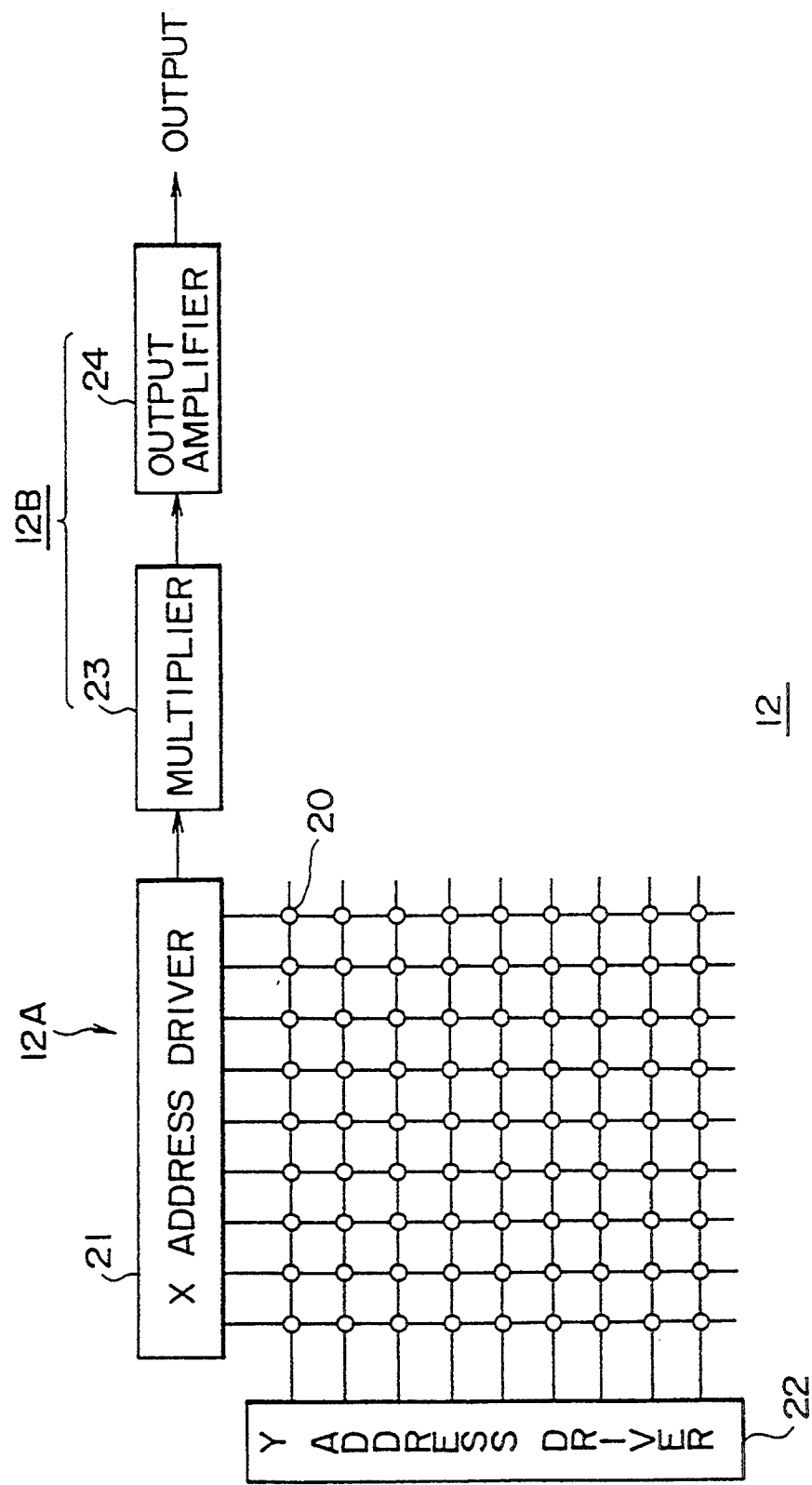
FIG. 2 is a schematic block diagram of an image sensor to which the present invention is applied and which is incorporated in the electronic still camera shown in FIG. 1.

Referring to FIG. 2, such CMD image sensor is constituted from a large number of CMD elements 20 arranged two-dimensionally, and a picture element signal can be read out from an arbitrary one of the CMD elements 20 by selecting an X address and a Y address by means of an X address driver 21 and a Y address driver 22, respectively. The picture element signal thus read out is outputted from the X address driver 21.

Figure 3:
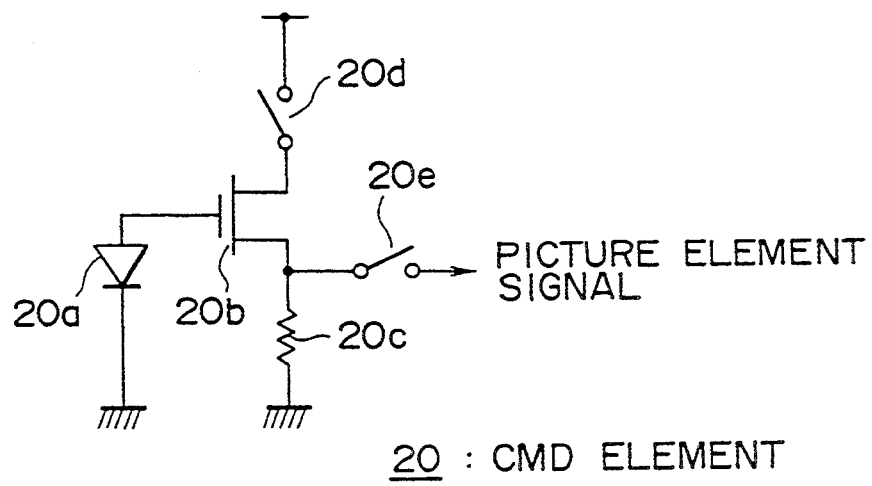
FIG. 3 is a circuit diagram showing details of a CMD element employed in the image sensor shown in FIG. 2.

A CMD element can be regarded as a composite element of a photo-sensor, an amplifier and a switch, and an equivalent construction of a CMD element 20 is shown in circuit diagram of FIG. 3. Referring to FIG. 3, the CMD element 20 shown includes a photodiode 20a serving as a photo-sensor, a MOSFET 20b serving as an amplifier, and a resistor 20c connected to the source of the MOSFET 20b. The photodiode 20a, the MOSFET 20b and the resistor 20c constitute a source follower. The CMD element 20 further includes a Y address connection switch 20d which connects the drain of the MOSFET 20b to a power source terminal. The CMD element 20 further includes an X address connection switch 20e by way of which a picture element signal obtained at the source of the MOSFET 20c, that is, at the output of the emitter follower, is outputted.

Detected up image charge is accumulated in a capacitor not shown the photodiode 20a has. Referring also to FIG. 2, the connection switches 20d and 20e of one of the CMD elements 20 selected in accordance with an X address and a Y address designated by the control circuit 5 are connected so that a picture element signal is read out from the CMD element 20. In this instance, even if the picture signal is read out, the accumulated charge is not discharged, and consequently, non-destructive reading is performed.

Figure 4:
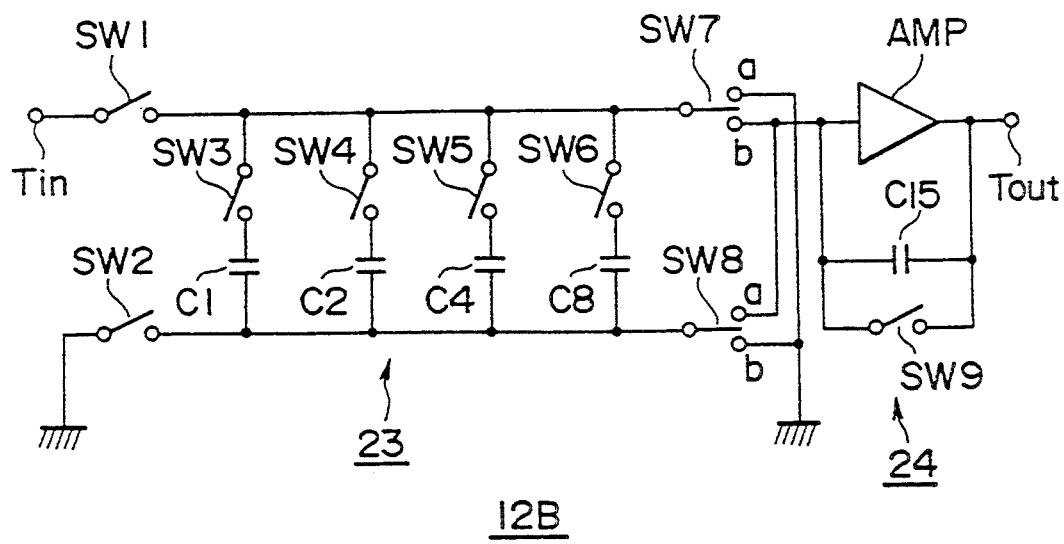
FIG. 4 is a circuit diagram showing details of a product sum calculation section of the image sensor shown in FIG. 2.

Referring back to FIG. 2, a picture element signal outputted from the image pickup section 12A is supplied to a series circuit of a multiplier 23 and an output amplifier 24 which constitute the product sum calculation section 12B. FIG. 4 shows a detailed construction of the product sum calculation section 12B.

Referring to FIG. 4, a picture element signal outputted from the image pickup section 12A is supplied to a terminal Tin. The terminal Tin is connected to a movable terminal of a change-over switch SW7 by way of a connection switch SW1. A fixed terminal of the change-over switch SW7 on the side a and a fixed terminal of another change-over switch SW8 on the side b are grounded. Another fixed terminal of the change-over switch SW7 on the side b is connected to a fixed terminal of the change-over switch SW8 on the side a. A movable terminal of the change-over switch SW8 is grounded by way of a connection switch SW2.

A series circuit of a connection switch SW3 and a capacitor C1, another series circuit of a connection switch SW4 and a capacitor C2, a further series circuit of a connection switch SW5 and a capacitor C4 and a still further series circuit of a connection switch SW6 and a capacitor C8 are connected in parallel between a junction between the connection switch SW1 and the change-over switch SW7 and another junction between the connection switch SW2 and the change-over switch SW8.

A fixed terminal of the change-over switch SW7 on the side b is connected to an input terminal of an amplifier AMP constituting an output amplifier 24, and a terminal Tout from which a signal after product sum calculation processing is outputted is connected to the output terminal of the amplifier AMP. A parallel circuit of a capacitor C15 and a connection switch SW9 is connected between the input terminal and the output terminal of the amplifier AMP. It is to be noted that the capacitors C1, C2, C4, C8 and C15 have capacitances which are proportional to values of the respective suffixes, and in the present arrangement, the coefficients may range from $-15$ to $+15$.

The product sum calculation processing of the product sum calculation section 12B of the construction described above proceeds in the following manner under the control of the control circuit 5.

1. The connection switch SW2 is switched on while the change-over switch SW8 is connected to the terminal on the side a and the connection switch SW9 is switched on without connecting the change-over switch SW7 to any of the terminals on the sides a and b thereby allowing the capacitor C15 to discharge.

2. The connection switch SW9 is switched off.

3. A signal of a picture element is read out from the image pickup section 12A. The connection switches SW1 and SW2 are switched on and a suitable one or ones of the connection switches SW3 to SW6 are switched on depending upon the value of a coefficient. Consequently, charge which is proportional to the picture element signal and has a value equal to a product of the operative one or ones of the capacitors C1, C2, C4 and C8 and the coefficient is accumulated.

4. The connection switches SW1 and SW2 are switched off. The change-over switches SW7 and SW8 are connected to the terminals on the side a or b depending upon the positive or negative sign of the coefficient. Consequently, charge which is proportional to the picture element signal and has the value equal to the product mentioned above is accumulated in the capacitor C15.

5. The steps 3 and 4 described above are repeated for required picture elements. For example, in the case of 3×3 spatial filtering, nine (3×3) picture elements around a picture element are read out and the steps 3 and 4 are repeated for the picture elements thus read out, and a picture signal obtained by the product sum calculation processing is sent to the terminal Tout.

Referring back to FIG. 1, such product sum calculation processing as described above is performed repetitively on the product sum calculation section 12B of the image sensor 12 in the electronic still camera shown. For example, DCT processing required for compression processing of the JPEG system is performed. Consequently, a detected up image signal after DCT processing is outputted from the image sensor 12.

The detected image signal processed by DCT processing and outputted from the image sensor 12 is supplied to the processing circuit 4.

The electronic still camera is constructed in such a manner as described above. It is-to be noted that, while compression processing based on the JPEG system is performed in the image compression circuit 9, since DCT processing is performed by the image sensor 12 described above, DCT processing of the image compression circuit 9 is omitted.

In the electronic still camera, since DCT processing required for compression processing is performed by the product sum calculation section 12B of the image sensor 12 and a detected image signal after such DCT processing can be obtained from the image sensor 12 in this manner, DCT processing is rendered unnecessary for the image compression circuit 9, resulting in simplification of the circuit configuration.

It is to be noted that, while DCT processing is performed by the product sum calculation section 12B of the image sensor 12 in the electronic still camera, any other orthogonal transformation processing or spatial filter processing can naturally be performed by similar product sum calculation processing.

Figure 5:
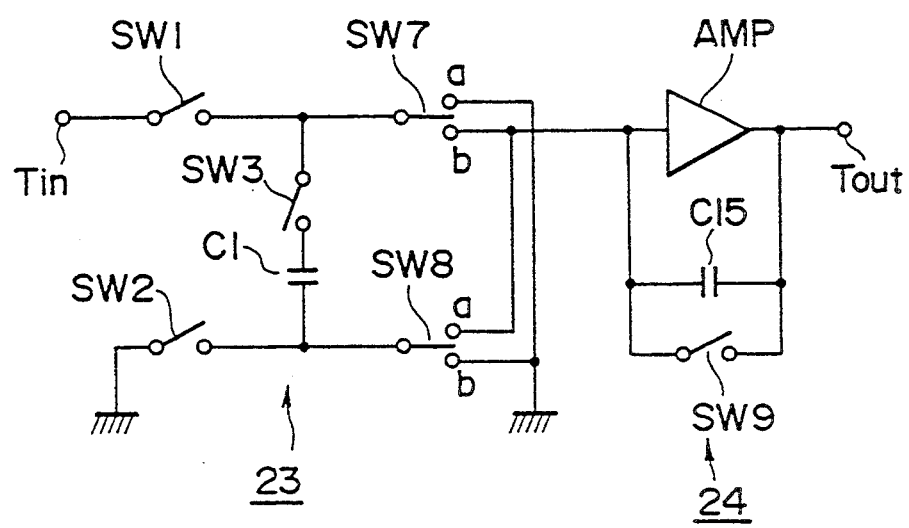
FIG. 5 is a circuit diagram showing details of another product sum calculation section.

Further, while the coefficients of the product sum calculation section 12B in the electronic still camera can have values ranging from −15 to +15, where the coefficients otherwise have only two values of −1 and +1, the product sum calculation section 12B can be simplified in construction as shown in FIG. 5. This facilitates switching control of the product sum calculation section by the control circuit 5. It is to be noted that like elements are denoted by like reference characters to those of FIG. 4.

Having now fully described the invention, it will be apparent to one of ordinary skill in the art that many changes and modifications can be made thereto without departing from the spirit and scope of the invention as set forth herein.

What is claimed is:

1. An image sensor, comprising:
   a control circuit for controlling an operation of said image sensor;
   an image pickup section for detecting an image and non-destructively reading out picture element signals representing the image according to address signals supplied by said control circuit; and
   a product sum calculation section for receiving said picture element signals selectively and successively read out from said image pickup section according to said address signals supplied by said control circuit, for multiplying the picture element signals by predetermined coefficients and for adding signals obtained by the multiplication to obtain an output picture element signal.

2. An image sensor according to claim 1, wherein said product sum calculation section includes means for performing a discrete cosine transformation.

3. An image sensor according to claim 1, wherein said image pickup section is a charge modulation device image sensor.

4. An image sensor according to claim 1, wherein said product sum calculation section includes means for performing spatial filter processing.

5. An image sensor according to claim 1, wherein said image pickup section includes a plurality of addressable picture elements and said product sum calculation section receives picture element signals successively read out from selected ones of said plurality of picture elements in said image pickup section according to respective address signals supplied by said control circuit, multiplies the picture element signals by the respective predetermined coefficients and adds the signals obtained by the multiplication.

6. An electronic still camera, comprising:
   a control circuit for controlling an operation of said electronic still camera;
   an image pickup section for detecting an image and non-destructively reading out picture element signals representing the image according to address signals supplied by said control circuit;
   a product sum calculation section for receiving said picture element signals selectively and successively read out from said image pickup section according to said address signals supplied by said control circuit, for multiplying the picture element signals by predetermined coefficients and for adding signals obtained by the multiplication to obtain an output picture element signal;
   compression means for compressing the output picture signal; and
   means for recording the compressed signal onto a recording medium.

7. An electronic still camera according to claim 6, wherein said product sum calculation section includes means for performing a discrete cosine transformation.

8. An electronic still camera according to claim 6, wherein said image pickup section is a charge modulation device image sensor.

9. An electronic still camera according to claim 6, wherein said product sum calculation section includes means for performing spatial filter processing.

10. An electronic still camera according to claim 1, wherein said image pickup section includes a plurality of addressable picture elements and said product sum calculation section receives picture element signals successively read out from selected ones of said plurality of picture elements in said image pickup section according to respective address signals supplied by said control circuit, multiplies the picture element signals by the respective predetermined coefficients and adds the signals obtained by the multiplication.

* * * * *